F. M. VOGEL.
HEATING DEVICE.
APPLICATION FILED FEB. 12, 1912.

1,120,987.

Patented Dec. 15, 1914.

WITNESSES:
J. Earl Ryan
J. Ellis Glen

INVENTOR:
FREDERICK M. VOGEL,
BY
HIS ATTORNEY.

UNITED STATES PATENT OFFICE.

FREDERICK M. VOGEL, OF PITTSFIELD, MASSACHUSETTS, ASSIGNOR TO GENERAL ELECTRIC COMPANY, A CORPORATION OF NEW YORK.

HEATING DEVICE.

1,120,987.

Specification of Letters Patent.

Patented Dec. 15, 1914.

Application filed February 12, 1912. Serial No. 677,075.

*To all whom it may concern:*

Be it known that I, FREDERICK M. VOGEL, a citizen of the United States, residing at Pittsfield, county of Berkshire, State of Massachusetts, have invented certain new and useful Improvements in Heating Devices, of which the following is a specification.

My invention relates to heating devices which are required to furnish heat intermittently for operations such as cooking. In such devices, it is desirable that provision be made for bringing the source of heat into good thermal conductive relation with the body to be heated and for removing it from such relation when desired.

My invention provides means for accomplishing this.

More specifically, my invention relates to heating devices forming part of heat storage ranges of the character disclosed in Patent No. 1,025,843, May 7, 1912, to William Stanley. In such ranges heat is stored in a mass of material having high specific heat per unit of volume and good thermal conductivity and means are provided for conducting or interrupting the flow of heat therefrom to the body to be heated by decreasing or increasing respectively the resistance of the thermal path. According to my invention, provision is made whereby the resistance of the thermal path may be varied at will by the rotation of the heat storage mass into or out of good thermal conductive relation with the body to be heated.

Viewed from another standpoint my invention includes the provision of a body of good heat conducting material adapted to support bodies to be heated and adjacent to the said body a storage mass, the said parts being so constructed and arranged that one of the same may be moved into contact with the other and the area of contact between them may be varied according to the heat flow desired.

Figure 1:
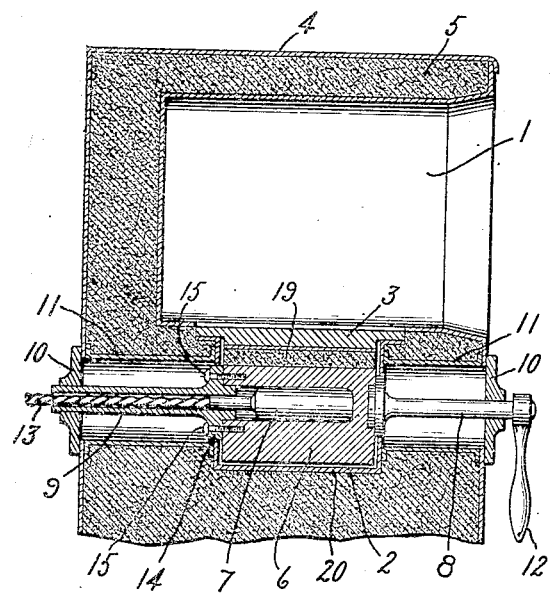
Figure 2:
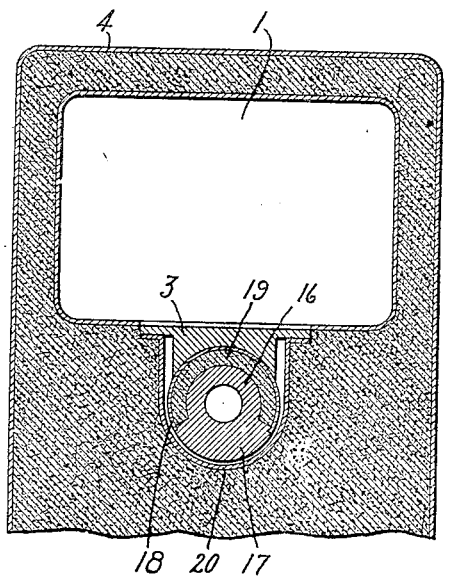
Figure 3:
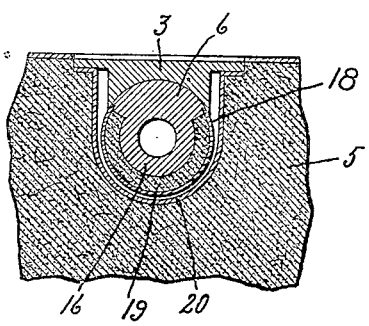

In the drawings Figure 1 is a longitudinal section through a portion of a range showing an oven and heating device when the former is not in use; Fig. 2 is a transverse section of the same; and Fig. 3 is a detailed section showing the position of the heating device when the oven is in use.

The range shown in the drawing comprises the oven 1, the heating device 2 and the heat conducting block or plate 3. The range comprises also a sheet metal casing 4 and heat insulation 5, which may be lampblack, powdered silica or infusorial earth packed between the casing 4 and the parts inclosed by the same.

The heating device 2 comprises the heat storage mass 6 in which is inserted the heating unit 7. The heat storage mass 6 is composed of metal such as iron having high specific heat per unit of volume and good heat conductivity. The heating device 2 is supported by means of the spindles 8 and 9 which are journaled in the bearings 10 mounted on the casing 4. The metal casings 11 surround the spindles 8 and 9. The spindle 8 is provided at its outer end with a handle 12 by means of which the heating device may be rotated. The spindle 9 is tubular and serves as a conduit for the conductors 13 leading to the heating unit 7.

The inner end of the spindle 9 is provided with a flange 14 through which it is secured to the storage mass 6 by means of screws 15. The storage mass 6 is unsymmetrically or eccentrically disposed with reference to the spindles 8 and 9 which are in line with its axis of rotation, being composed of two parts 16 and 17 of different radii as shown in Figs. 2 and 3. A cylinder having the larger of these radii is completed by means of the shell 18 between which and the portion 16 of the storage mass is interposed insulating material 19 which may be the same as insulation 5.

The heating device is surrounded by the casing 20. This casing as well as casings 11, shafts 8 and 9, shell 18, and the throat of the oven 1 may be composed of metal of high specific heat resistance such as calorite described in Patent No. 901,428 to Dempster to prevent loss of heat. However, the use of such metal forms no part of my invention.

The block or plate 3 which may be located in the bottom of the oven 1 is composed of metal similar to that of the storage mass 6. The upper part of this block or plate coincides with the bottom of the oven. The lower surface, however, is so concaved as to conform to the surface of the storage mass 6 when the latter is rotated into the position shown in Fig. 3. The block or plate 3 may be mounted loosely so as to allow for expansion. It is obvious that this block or plate may be omitted, its purpose being merely to complete a thermal path of good conductivity to the oven at the same time to preserve a flat bottom therein.

By means of the electrical unit 7, heat may be stored in the mass 6. When the oven is not in use the parts occupy the positions shown in Figs. 1 and 2. When it is desired to cook in the oven 1 the handle 12 is rotated to bring the parts into the relation shown in Fig. 3. In this position the resistance of the thermal path is low owing to the good conductivity of the parts 3 and 6 and heat is rapidly transmitted to the oven. When the cooking operation is completed a further rotation of the handle 12 brings the parts into the positions shown in Figs. 1 and 2, thus interposing the insulation 19 in the thermal path and conserving the heat in the storage mass.

It is obvious that although I have shown my device in connection with an oven it may be used in connection with any receptacle or holder for bodies to be heated, or may be used without such receptacle or holder. It is obvious also that various changes may be made in the insulation for the storage mass and the location of the heating unit therein. Various other modifications may be made in the shapes and proportions of the various parts of the device without departing from the spirit of my invention, the scope of which is set forth in the annexed claims.

What I claim as new and desire to secure by Letters Patent of the United States, is:—

1. A heating device comprising a rotatably mounted storage mass normally surrounded by heat insulation, electrical heating means for said mass, and means whereby the mass may be rotated so as to bring the same into heat conducting relation with an external body to be heated.

2. A heating device comprising a body of material having high heat conductivity for supporting articles to be heated, a heat storage mass having high heat conductivity mounted adjacent to the said body, the said parts being so mounted as to allow relative movement thereof to bring the same into contact, and means for varying the area of contact between the said parts.

3. A heating device comprising a body of heat insulation having an opening therein, a rotatably mounted storage mass located in said opening, heat insulation partially covering said mass and rotatable therewith, and means for rotating the mass so as to either bring the same into heat conducting relation to an external body to be heated or completely inclose it in the heat insulation.

4. A heater comprising a rotatably mounted body consisting of an electrically heated storage mass of good heat conductivity and heat insulation covering a portion of the surface thereof, heat insulating means substantially surrounding the aforesaid rotatably mounted body and having an opening therein leading to the said body, and means for rotating the said body to bring the surface of the insulation or of the storage mass as desired into registry with the aforesaid opening.

5. A heating device comprising a rotatably mounted electrically heated storage mass of good heat conductivity having portions located at different distances from the axis of rotation, heat insulating means substantially surrounding the same and having an opening therethrough leading to the storage mass, and means for rotating the latter so as to expose any portion desired through the opening in the heat insulation.

6. A heater comprising a support for bodies to be heated, and a normally insulated heat storage mass rotatably mounted adjacent to the said support and adapted to be brought by rotation into or out of good heat conductive relation thereto.

7. A heating device comprising a fixed support for articles to be heated having high heat conductivity, a heat storage mass having high heat conductivity, and means whereby the thermal relation between the heat storage mass and the support may be varied to vary the amount of heat conducted from the storage mass to the support in accordance with the requirements of the article to be heated.

8. A heating device comprising a fixed support for articles to be heated having high heat conductivity, a heat storage mass having high heat conductivity, and means for varying the area of contact between the said parts whereby the amount of heat conducted from the heat storage mass through the support to the articles to be heated may be regulated in accordance with the requirements of the article to be heated.

9. A heating device comprising a fixed support for articles to be heated having high heat conductivity, a heat storage mass having high heat conductivity, and means for varying the conductivity of the path between the storage mass and the fixed support whereby the amount of heat conducted from the storage mass to the articles to be heated may be regulated.

10. A heating device comprising a support for articles to be heated having high heat conductivity, a heat storage mass having high heat conductivity and means for varying the thermal relation between the storage mass and the support in accordance with the requirements of the article to be heated.

11. A heating device comprising a fixed support for articles to be heated having high heat conductivity, a heat storage mass having high heat conductivity, and means for varying the area of the heat conducting path between the storage mass and the fixed support.

In witness whereof, I have hereunto set my hand this 8th day of Feb., 1912.

FREDERICK M. VOGEL.

Witnesses:
ANNIE R. NUGENT,
CHARLES S. MEIGS.

Copies of this patent may be obtained for five cents each, by addressing the " Commissioner of Patents Washington, D. C."